United States Patent Office 3,408,407
Patented Oct. 29, 1968

3,408,407
NOVEL BISPHENOLS OF CYCLOHEXADIENE
Robert J. Cotter, Bernardsville, Francis N. Apel, Nutley, and Louis B. Conte, Jr., Newark, N.J., assignors to Union Carbide Corporation, a corporation of New York
No Drawing. Filed Mar. 27, 1964, Ser. No. 355,461
1 Claim. (Cl. 260—619)

This invention relates to novel bisphenols of cyclohexadiene and condensation polymers prepared from them.

Heretofore it has been known to condense phenols with aldehydes and ketones to produce bisphenols. The bisphenols thus produced have their phenolic portions on a single carbon atom. The close proximity of the phenolic portions has limited the control which can be exercised over the properties of these known bisphenols and condensation polymers containing these bisphenol moieties. Methods have been proposed to put the phenolic portions on different carbon atoms as by a double Fries rearrangement of the phenolic esters of dibasic acids, but such processes have not been practically useful.

It is an object, therefore, of the present invention to provide bisphenols wherein the phenolic portions are attached to different carbon atoms.

It is another object to provide condensation polymers containing bisphenol moieties whose phenolic portions are attached to different carbon atoms.

It is another object to provide bisphenol condensation polymers having high glass transition temperatures and inherent toughness.

It is another object to provide a practical method for producing bisphenols whose phenolic portions are on different carbon atoms.

It is another object to provide novel bisphenols.

It has now been discovered that bisphenols having phenolic portions on different carbon atoms are prepared by contacting together either 1,3- or 1,4-cyclohexadiene and at least a stoichiometric amount of a phenol with an acidic alkylation catalyst.

The reaction shown for phenol and 1,3-cyclohexadiene proceeds, in general, as follows:

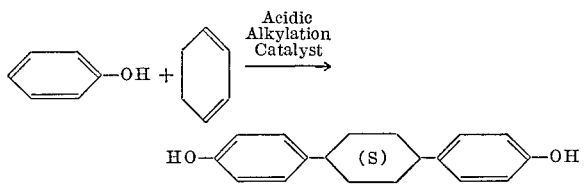

This compound is 1,4-bis(p-hydroxyphenyl)cyclohexane, a bisphenol of cyclohexadiene, and is a new compound. The reaction of phenol with 1,4-cyclohexadiene affords this same compound, 1,4 - bis(p-hydroxyphenyl)cyclohexane.

The proof of structure of the 1,4-bis(p-hydroxyphenyl)cyclohexane isolated from the alkylation of phenol with either 1,3- or 1,4-cyclohexadiene was carried out in three steps. The first step involved the formation of the di-n-butyl phosphate compound:

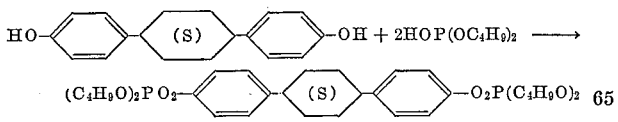

The second step was the reduction of the di-n-butyl phosphate compound to the hydrocarbon:

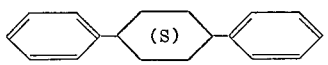

The third step was the halogenation and the dehydrohalogenation of the hydrocarbon resulting in the formation of p-terphenyl or 1,4-diphenyl benzene:

The identification of this product as p-terphenyl was made through its melting point, 212–213° C., and its infrared spectrum. A mixed melting point with an authentic sample of p-terphenyl having a melting point of 212–213° C. was the same. The other possible isomers, o-terphenyl and m-terphenyl have melting points of 58° C. and 89° C., respectively.

A substantial molar excess of phenol over cyclohexadiene is desirable. Thus molar ratios of from 3 to 20 and more moles of the phenol per mole of cyclohexadiene are completely suitable. Molar ratios of from 6 to 12 moles of phenol per mole of cyclohexadiene provide good reaction rates and are easily handled, and hence, are preferred. Molar ratios of about 10 to 1 of phenol per mole of cyclohexadiene provide optimum rates with the catalyst of this invention and, hence, are particularly preferred.

The reaction can be carried out at atmospheric, subatmospheric of superatmospheric pressure and at temperatures ranging from about 30° C. to about 150° C. Reaction temperatures above about 50° C. insure good viscosity in the reaction mixture and temperatures below about 125° C. permit reaction without use of elaborate pressure equipment and thus are preferred. Particularly preferred is reaction under atmospheric pressure at temperatures from 70° C. to 100° C.

Several preparative routes have been published in the technical literature for the synthesis of 1,3- and 1,4-cyclohexadiene such as the dehydration of cyclohexanediols with sulfuric acid, and dehydrohalogenation of dihalocryclohexanes by quinoline or alcoholic sodium ethoxide and the sodium-alcohol reduction of benzene in liquid ammonia.

Phenols which can be reacted with cyclohexadiene to form the bisphenols of cyclohexadiene of this invention are hydroxy substituted aryl compounds having a replaceable hydrogen attached to a ring carbon atom in a position preferably either ortho or para to a phenolic hydroxyl. Thus, the term "phenol" includes mono-nuclear and polynuclear substituted and unsubstituted hydroxyaryl componds. A "replaceable hydrogen" as the term is used in the present specification and claim is (1) a hydrogen which is attached to a carbon atom which is not impeded from reacting with cyclohexadiene by the spatial arrangement of nearby atoms forming a part of the same molecular, i.e., is sterically unhindered and (2) is electronically unhindered, i.e., is not limited in activity by the presence, in other positions in the phenolic ring, of substituents tending to attract the ortho and para hydrogen more strongly to the phenolic ring, e.g., nitro groups. Among the phenols having replaceable hydrogens in the positions ortho and para to a phenolic hydroxyl, some of those deserving of special mention are: hydroxy substituted benzenes, e.g., phenol, catechol, pyrogallol, resorcinol, phloroglucinol, and unsymmetrical trihydroxy substituted benzenes; phenols having in the meta positions, ortho positions or para position, providing at least one of the ortho position or the para position is unsubstituted, one or more ortho or para directing substituents such as alkyl groups, aryl groups, alkaryl groups, aralkyl groups, halogen groups, i.e., florine, chlorine, bromine and iodine, alkoxy groups and aryloxy groups. Preferred as substituents in the above compounds are straight and branched chain alkyl and aralkyl groups having from 1 to 10 carbon atoms, particularly lower alkyl substituents, i.e., having from 1 to 6 carbon atoms. Among the substituted phenols those deserving of special mention are the cresols, xylenols, guaiacol, 4-ethylresorcinol, 5-methylresorcinol, 4-propylresorcinol, carvacrol, methylphenol, ethylphenol, butylphenol, octylphenol, dodecylphenol, eicosylphenol, tricontylphenol, and tetracontylphenol, 2,3-dimethylphenol, 2,4-dimethylphenol, 2-ethyl-4-propylphenol, 2,5 - dimethylphenol, 2-ethyl-4-methylphenol, 2,4 - diethylphenol, 2-methyl - 4 - butylphenol, 2-ethyl - 5 - methylphenol, 2-methyl-5-isopropylphenol, 2-propyl - 5 - methylphenol, 2-isopropyl-5-methylphenol, 2,6-dimethylphenol, 2-methyl - 6 - ethylphenol, 2,6-diethylphenol, 2-methyl - 6 - propylphenol, 3,4-dimethylphenol, 3-methyl - 4 - ethylphenol, 3,5-dimethylphenol, 3,5-diethylphenol, 2-chloro - 4 - methylphenol, 2-ethyl-4-chlorophenol, 3-chloro - 4 - methylphenol, 2,3,4-trimethylphenol, 2,3,5-trimethylphenol, 2,4-dimethyl - 5 - ethylphenol, 2-ethyl - 4,5-dimethylphenol, 2,4-diethyl-5-methylphenol, 3,4,5-trimethylphenol and higher alkyl phenols.

Thus the term "bisphenol of cyclohexadiene" as used herein includes compounds having the formula

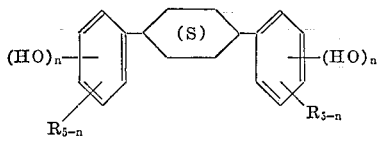

wherein R is a hydrogen, a halogen, a hydrocarbon substituent free of aliphatic unsaturation, or a saturated oxyhydrocarbon substituent on a phenolic ring carbon atom, selected for example, from alkyl, aryl, alkaryl, aralkyl, alkoxy, or fluorine, chlorine, bromine or iodine groups and $n$ is an integer from 1 to 3. Hence, the term "phenyl" herein includes substituted phenyl radicals. The point of attachment of the above phenolic portions is para to a phenolic hydroxyl.

The acidic alkylation catalyst used in the reaction of the above phenols with cyclohexadiene in the present invention comprises a Friedel-Crafts catalyst including the hydrogen form ($H^+$) of a cation exchanging resin, i.e., an "acidic" cation exchanging resin. These resins are insoluble in the reaction mixture and hence, there is no problem of catalyst separation from the reaction zone effluent or need of removal of small amounts of impurities in the product. Throughout the reaction and product recovery the catalyst remains in the reaction zone. The service life of the acidic cation exchanging resin in this method is nearly infinite and hence, the resin does not of necessity have to be regenerated, if care is exercised in preventing the introduction of basic metal ions such as sodium, potassium, calcium etc. or other contaminants which inactivate the cation exchanging groups of the resin. The use of this insoluble catalyst confers the additional advantages of (1) eliminating the need for acid corrosion resistant equipment which is otherwise essential and (2) making unnecessary any neutralization steps.

The cation exchanging resins are substantially insoluble polymeric skeletons with strongly acidic cation exchanging groups chemically bound thereto. The exchange potential of the bound acidic groups and the number of them which are available for contact with the phenol and cyclohexadiene reaction mixture determine the alkylating effectiveness of a particular cation exchanging resin. Thus, although the number of acidic groups bound to the polymeric skeleton of the resin determines the theoretical "exchange capacity" thereof, a more accurate criterion of catalytic effectiveness is the number of acidic groups available for contact with the reactants. This contact can occur on the surface or in the interior of the cation exchanging resin; therefore, a form of resin which provides a maximum amount of surface area for contact and diffusion, e.g., porous microspheres or beads, is highly desirable and affords the highest rate of reaction and reaction economy in this process. The particular physical form of the cation exchanging resin used, however, is not critical.

The cation exchanging resins should be substantially insoluble in the reaction mixture and in any solvent to which the resin may be exposed in service. Resin insolubility is generally attributable to crosslinking within the resin but can be caused by other factors, e.g., high molecular weight or a high degree of crystallinity.

In general, the greater the exchange capacity of a resin, i.e., the greater the number of milliequivalents of acid per gram of dry resin, the more desirable is the resin. Resins having an exchange capacity greater than about two milliequivalents of acid per gram of dry resin are preferred. Particularly preferred are resins with bound cation exchanging groups of the stronger exchange potential acids. Results obtained with cation exchanging resins having bound sulfonic acid groups have been highly satisfactory. Among the cation exchanging resins which are highly deserving of special mention are: sulfonated styrene-divinylbenzene copolymers, sulfonated crosslinked styrene polymers, phenol formaldehyde sulfonic acid resins, benzene-formaldehyde-sulfonic acid resins, and the like. Most of these resins and many others are available commercially under trade names such as: Amberlite XE–100 (Rohm and Haas Co.); Dowex 50 X–4 (Dow Chemical Co.); Permutit QH (Permutit Co.); and Chempro C–20 (Chemical Process Co.).

Many cation exchanging resins are received from the manufacturer in the form of the sodium or other salt and must be converted to the hydrogen or acid form prior to use in this process. The conversion can be easily accomplished by washing the resin with a solution of a suitable mineral acid, e.g., sulfuric, hydrofluoric or hydrochloric acids. For example, a sulfonated resin can be suitably washed with a sulfuric acid solution. Salts formed during the conversion procedure are conveniently removed by washing the resin with water or solvent for the salt.

It frequently happens as a result of either the washing operation outlined above, or the manufacturer's method of shipping, that the resin will contain from 50 percent to 100 percent of its own weight of water. All but about 2% of this water as a maximum is preferably removed prior to use of the cation exchanging resin. Suitable methods for removing the water in the resin include drying the resin under reduced pressure in an oven; soaking the resin in melted anhydrous phenol for a time sufficient to fill the resin interspaces with phenol and azeotropic distillation of water and phenol in the presence of an excess of phenol.

The resin when once conditioned in this manner to insure anhydrous conditions, i.e., <2% water throughout, does not require reconditioning at any time during use. Alternatively, the resin can be conditioned after installation in the process equipment merely by running the reaction mixture through the resin until sufficient water is removed. In this latter procedure, dehydration is accomplished by the phenol.

The bisphenols of this invention are readily separable from the resin catalyst by filtration and can be purified by a vacuum stripping operation which removes undesirable impurities. If desired, further purification can be achieved by recrystallization from toluene, xylenes and like solvents.

The Friedel-Crafts catalyst used in this invention can also be halides such as $AlCl_3$, $AlBr_3$, $BF_3$, $ZnCl_2$, $FeCl_3$, $SnCl_4$, $TiCl_4$, $TiCl_3$, $BeCl_2$, $HfCl_4$, $ThCl_4$, $NbCl_5$, $TaCl_5$, $UCl_4$, $WCl_6$, $SbCl_5$, $BiCl_3$, $AsF_3$, and $CbCl_5$; oxides such as $Al_2O_3$, $TeO_3$, $P_2O_5$, and the like; salts of phenol such as titanium, copper, zinc and aluminum phenates; inorganic acids or acid salts as for example, HF, $H_3BO_2F_2$, $H_3PO_4$, $H_3BO_3$, HCl, $H_2SO_4$, and their salts, as for example $AgSO_4$, $HgSO_4$; organic acids, as for example, oxalic acid, p-toluenesulfonic acid, acetic acid plus $H_2SO_4$ and the like; and amorphous and crystalline, synthetic and natural aluminasilicates such as Linde decationized molecular sieves or zeolites. These catalysts should be employed preferably in amounts from 1 to about 2 parts by weight per 100 parts by weight of the reaction mixture. Greater or lesser amounts, e.g., from 0.55 to 25 parts by weight per 100 parts by weight of the reaction mixture can also be used. It is preferred that these catalysts be substantially free of water, i.e., less than about 2% by weight.

It has been found that condensation polymers can be synthesized from the bisphenols of this invention which exhibit in addition to other physical properties, high glass transition temperatures, tensile strengths and tensile moduli.

For example, polycarbonates of bisphenols of cyclohexadiene can be readily prepared in interfacial condensation systems. In a preferred synthesis, the dichloroformate of the bisphenol of cyclohexadiene is prepared first with phosgene and dimethylaniline. When polymerized in an aqueous sodium hydroxide-methylene chloride mixture, a polycarbonate is obtained represented by the following structure:

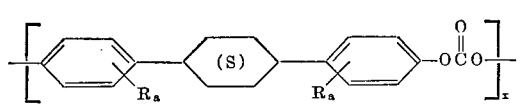

wherein $x$ is an integer denoting the degree of polymerization and has values sufficiently high to afford a normally solid polymer, R is a member selected from the group consisting of hydrogen, halogen, hydrocarbon free of aliphatic unsaturation and saturated oxyhydrocarbon groups, and $a$ is an integer having values of 0 to 4.

The preparation of polycarbonates of bisphenols of cyclohexadiene is not limited to this method since direct phosgenation or ester interchange utilizing a diaryl carbonate such as, diphenyl carbonate can also be employed.

As a variation, bisphenols of cyclohexadiene can also be copolymerized with other bisphenols as, for example, bisphenol-A, 2,2 - bis(p-hydroxyphenyl)propane, to provide carbonate copolymers.

The structure of these copolymers is represented below:

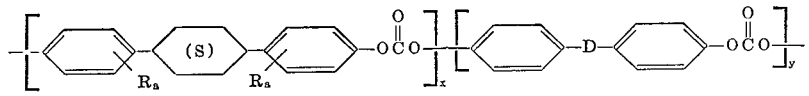

wherein R is a hydrogen, a halogen, a hydrocarbon group free of aliphatic unsaturation or a saturated oxyhydrocarbon group, $a$ is an integer having values of 0 to 4 and D is a divalent radical such as alkylidene, cycloalkylidene or arylene radicals or

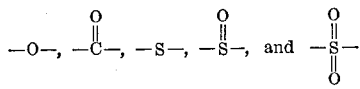

radicals and $x$ and $y$ are integers, the sum of which is sufficiently high to afford normally solid polymers.

Similarly, carbonate copolyesters of bisphenols of cyclohexadiene can also be prepared by the interaction of these bisphenols with dicarboxylic acids by direct phosgenation with phosgene.

Another series of useful condensation polymers available from bisphenols of cyclohexadiene is the polyurethanes. Thus, when the dichloroformate of a bisphenol of cyclohexadiene is caused to react with piperazine a polyurethane is obtained having the structure:

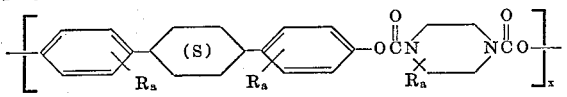

wherein $x$ is an integer having values sufficiently high to afford a normally solid polymer, R is as defined above for the polycarbonates of this invention and $a$ is an integer having values of 0 to 4.

Other synthetic routes such as direct phosgenation or ester interchange can also be used to prepare these urethanes.

Polyesters of bisphenols of cyclohexadiene can be synthesized by interacting dicarboxylic acids, esters, or acid halides, with bisphenols of cyclohexadiene, with or without the use of a solvent.

Poly(hydroxyethers) of bisphenols of cyclohexadiene can be prepared by the procedure described in French Patent 1,309,491.

Other applications for the bisphenols of cyclohexadiene include their use as hardeners for epoxy resins, bactericides, fungicides, miticides and antioxidants.

The following examples illustrate the practice of the present invention. All parts and percentages are by weight unless otherwise stated.

EXAMPLE 1.—Preparation of 1,4-bis(p-hydroxyphenyl)cyclohexane

To a one-liter, three-necked, round bottom flask equipped with a mechanical stirrer, thermometer, reflux condenser, dropping funnel and heating mantle, was added 470 g. (5 moles) of freshly distilled, molten phenol and 125 g. (about 0.5 hydrogen equivalents) of the acid form of Dowex 50 X–4 which has had essentially all of the water displaced by phenol. The resultant slurry was heated to 70–75° C. and heating then discontinued. 0.62 mole of 1,3-cyclohexadiene (50 g.) was added dropwise while the exotherm was controlled with cooling water to maintain the temperature at 70–75° C. As the exotherm diminished, heat was applied. At the end of the 22 hour reaction period, the mixture was filtered and the catalyst washed with 250 ml. of freshly distilled molten phenol. The combined filtrate and washings were distilled to remove the fraction boiling up to 200° C. at 1–5 mm. The yield of crude 1,4-bis(p-hydroxyphenyl)cyclohexane remaining in the distillation pot as residue was 116 g. or a yield of 70% based on the 1,3-cyclohexadiene. A sample recrystallized from toluene for analysis had a melting point of 230–232° C. and an hydroxyl value of 12.5% (theoretical value—12.7%).

Analysis by means of reversed phase filter paper chromotography in which the sample is carried by an aqueous alkaline solution through paper impregnated with tricresyl phosphate indicated that the product was essentially 1,4-bis(p-hydroxyphenyl)cyclohexane. There was a strong single, purple band with a front ratio value ($R_f$) of 0.23.

The amount of cation exchanging resin used can be varied over a wide range with commensurate rates of reaction. Concentrations of catalyst ranging from about 0.1 to about 5 acid equivalents per mole of cyclohexadiene are preferred. Lower concentrations provide less rapid reaction rates. Cation exchanging resin concentrations ranging from about three tenths of an acid equivalent to about four acid equivalents per mole of cyclohexadiene have given excellent results and are particularly preferred.

A concentration of about one acid equivalent of cation exchanging resin per mole of cyclohexadiene provides the optimum combination of reaction rate, yield, and product quality. It is a particularly desirable concentration when operating at temperatures between about 70° and 75° C. with a 10:1 ratio of phenol to cyclohexadiene.

EXAMPLE 2.—Identification of 1,4-bis(p-hydroxyphenyl)cyclohexane

The first step in the proof of structure of 1,4-bis(p-hydroxyphenyl)cyclohexane, the formation of the di-n- butyl phosphate derivative was carried out by stirring a solution of 25 ml. of CCl₄, 3.35 g. (0.05 mole) of the bisphenol and 5.3 g. (0.11 mole) of di-n-butyl phosphite in a 100 ml. 3-neck, round bottom flask equipped with a mechanical stirrer, thermometer, dropping funnel and reflux condenser. During this operation the flask was cooled in an ice bath to about 5° C. while 2.5 g. (0.11 mole) of triethylamine was added dropwise over a 5 minute period. Stirring was continued for 1 hour at 5° C. and then at 25° C. for about 15 hours. The reaction mixture was then transferred to a separatory funnel containing 20 ml. of water and 15 ml. of CCl₄. After shaking, the water layer was discarded and the CCl₄ layer washed in the separatory funnel with successive washes of 20 ml. of water, 20 ml. of 5% aqueous HCl, four 15 ml. portions of 5% aqueous NaOH and 25 ml. of water. The CCl₄ layer was removed, dried over anhydrous sodium sulfate, filtered and the filtrate distilled free of CCl₄ in vacuo. The yield of di-n-butyl phosphate of 1,4-bis(p-hydroxyphenyl)cyclohexane recovered as a pale yellow brown oil residue was 8.5 g. (100% yield). Its infrared spectrum revealed no hydroxyl abosrption.

The second step, the reduction of the phosphate derivative was accomplished by stirring a mixture of 8.0 g. of the phosphate derivative, 20 ml. of anhydrous ethyl ether and 80 ml. of liquid ammonia in a 500 ml., 3-neck, round bottom flask equipped with a mechanical stirrer, thermometer and reflux condenser while adding 1.1 g. of metallic sodium in small portions. The resultant blue solution was stirred for an additional hour followed by the cautious addition of 2.25 g. of ethanol.

The ammonia was evaporated and the residue shaken in a separatory funnel with 60 ml. of diethyl ether and 15 ml. of 5% aqueous sodium bicarbonate. After discarding the aqueous layer, the ether solution was washed with three 15 ml. portions of distilled water. The ether layer was dried over anhydrous sodium sulfate and the ether removed by evaporation. The residue was dissolved in 5 ml. of n-hexane and this solution passed through a column of 15 g. of chromatographic grade alumina. Elution was effected with 120 ml. of n-hexane. After evaporation of the n-hexane a white residue of a diphenyl cyclohexane, having a melting point of 170–172° C., was obtained.

The third step, the formation of p-terphenyl, was effected in a 100 ml. round bottom, 3-neck flask equipped with stirrer, thermometer and reflux condenser. A solution of 5.5 g. (0.31 mole) of N-bromosuccinimide, 0.075 g. of benzoyl peroxide, 50 ml. of CCl₄ and 2.45 g. (0.01 mole) of the above diphenyl cyclohexane was heated at reflux temperature under nitrogen for 6 hours. When the evolution of HBr ceased, the solution was cooled and about 3.3 g. of succinimide which had separated out of solution was removed by filtration. The CCl₄ filtrate was stripped in vacuo leaving a white residue of p-terphenyl, melting point 212–213° C. The identification of p-terphenyl was confirmed from its infrared spectrum and a mixed melting point with an authentic sample of p-terphenyl which had a melting point of 212–213° C.

EXAMPLE 3.—Preparation of the bis(o-cresol) of cyclohexadiene

To a round-bottom, 3-necked flask fitted with stirrer, thermometer, reflux condenser and a dropping funnel is added 940 grams (about 1 acid equivalent) of a sulfonated styrene divinyl benzene copolymer cation exchanging resin prepared as described above by replacing with o-cresol substantially all the water therefrom, i.e., to less than 2%.

The mixture of cataylst and o-cresol is heated to 70–75° C. and 80 grams (1 mole) of 1,3-cyclohexadiene is added dropwise over a 30 minute period. Cooling during this period maintains the temperature of the reactants between 70 and 75° C. After the addition and when the exotherm subsides, heat is applied for an additional 5 hours to maintain a temperature between 70 and 75° C. After this period, the warm reaction mixture is filtered and the catalyst washed with 250 grams of molten o-cresol. The combined filtrate and washings are distilled at a reduced pressure at about 1 mm. Hg pressure to a final residue temperature of 200° C. The residue comprises the bis (o-cresol) of cyclohexadiene.

EXAMPLE 4.—Preparation of the bis(o-chlorophenol) of cyclohexadiene

The apparatus and the procedure of Example 3 are used but o-chlorophenol is substituted for the o-cresol. The residue comprises the bis(o-chlorophenol) of cyclohexadiene.

Other hydroxyaryl compounds can be reacted with 1,3- or 1,4-cyclohexadiene to produce the corresponding bisphenols. For example, polynuclear substituted and unsubstituted hydroxyaryl compounds, e.g., the naphthols especially α- and β-naphthols are readily reacted with cyclohexadienes using the cation exchanging resin catalysts of the present invention.

The preparation is illustrated by the following example:

EXAMPLE 5.—Preparation of the bis(α-naphthol) of cyclohexadiene

In a two liter flask equipped with a stirrer, thermometer, dropping funnel and reflux condenser is placed 900 grams of α-naphthol. The temperature is raised to 100° C. and with stirring there is added 200 grams of oven dried (105–110° C.) Dowex 50 X-4 cation exchanging resin in the acid (H+) form.

Stirring is continued and 40 grams (0.5 mole) of cyclohexadiene is added dropwise over a 1 hour period at 100–105° C. Heating and stirring are continued for 4 hours after addition is completed.

The reaction mixture is filtered and the cation exchanging resin washed with 200 grams α-naphthol. The filtrate and washings are combined and distilled at less than 0.5 mm. Hg to a final residue temperature of 200° C.

The residue is the bis(α-naphthol) of cyclohexadiene.

EXAMPLE 6.—Preparation of the dichloroformate of 1,4-bis(p-hydroxyphenyl)cyclohexane To a slurry of 19.55 g. (0.073 mole) of 1,4-bis-(p-hydroxyphenyl)cyclohexane and 250 ml. of dry toluene contained in a 3-neck, round-bottom flask equipped with a mechanical stirrer, reflux condenser, thermometer and dropping funnel was added 15.2 g. (0.154 mole) of phosgene. A solution of 17.7 g. (0.146 mole) of dimethylaniline in 20 ml. of toluene was then added dropwise from the dropping funnel. The reaction mixture was stirred at ambient temperatures for about 2 hours. Insoluble dimethylaniline hydrochloride was removed from the reaction product by filtration and the filtrate stripped of solvent by vacuum distillation. The residue which weighed 27.14 g. was dissolved in 100 ml. of methylene chloride and the solution passed through a silica gel column (2.9 x 26.2 centimeters). The product was eluted with 250 ml. of methylene chloride and the combined eluants were stripped free of solvent. The residue, amounting to 16.89 g., was identified by infrared absorption spectra as the dichloroformate of 1,4-bis(p-hydroxyphenyl) cyclohexane having a typical chloroformate carbonyl absorption band at 5.65 microns. There was no absorption at 3.0 microns, the band for phenolic hydroxyl absorption.

EXAMPLE 7.—Polymerization of the dichloroformate of 1,4-bis(p-hydroxyphenyl)cyclohexane A solution of 3.93 g. (0.01 mole) of the dichloroformate of 1,4-bis(p-hydroxyphenyl)cyclohexane in 50 ml. of methylene chloride was added to a solution of 0.8 g. of sodium hydroxide in 75 ml. of water contained in a 250 ml. 3-neck round bottom flask equipped with a mechanical stirrer, reflux condenser and thermometer. The reaction mixture was stirred for five minutes followed by the addition of 5 drops of triethylamine and stirring continued for 1.5 hours at ambient temperatures. The reaction mixture was then poured slowly into a Waring Blendor containing 300 ml. of isopropanol. The polycarbonate which was thus precipitated was washed in the blendor with three 250 ml. portions of water. The product after drying in vacuo amounted to 2.84 g. (96% yield) and possessed a reduced viscosity of 0.79 when measured in a concentration of 0.2 g./100 ml. of chloroform at 25° C. This polycarbonate of 1,4-bis(p-hydroxyphenyl)cyclohexane may be represented by the following structure:

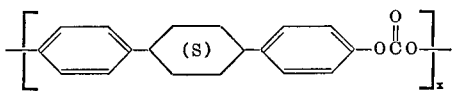

wherein $x$ is an integer having values sufficiently high to afford normally solid polymers. Films of this polycarbonate cast from chloroform were used for Instron analysis which revealed a tensile strength of 86,000 p.s.i., tensile modulus of 215,000 p.s.i. and an elongation of 110%. The glass transition temperature (Tg) was 190–195° C. The pendulum impact strength was 600 ft. lbs./in.$^3$.

EXAMPLE 8.—Copolymerization of the dichloroformate of 1,4-bis(p-hydroxyphenyl)cyclohexane with Bisphenol-A A mixture made from a solution of 2.28 g. (0.01 mole) of Bisphenol-A in 50 ml. of methylene chloride, 100 ml. of water, 3 drops of triethylamine, 1 g. of sodium hydroxide, and 3.93 g. (0.01 mole) of the dichloroformate of 1,4-bis(p-hydroxyphenyl)cyclohexane was stirred in the apparatus described in Example 7. Stirring was continued for ten minutes and then 5 additional drops of triethylamine added. Stirring was continued for 1 hour at ambient temperatures. After precipitation of the copolymer by 300 ml. of isopropanol in a Waring Blendor it was washed with three 250 ml. portions of water. The yield of mixed polycarbonate after drying in vacuo amounted to 4.88 g. (89% yield). This product possessed a reduced viscosity in chloroform at 25° C. of 1.33 (0.2 g. sample in 100 ml. of chloroform). Instron analysis of films of this polycarbonate cast from chloroform showed a tensile strength of 10,000 p.s.i., a tensile modulus of 236,000 p.s.i., and an elongation of 120%. The Tg was 185° C. and the pendulum impact value was 75 ft. lbs./in.$^3$. The structure of this polycarbonate is shown below.

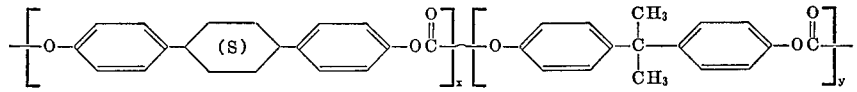

wherein $x$ and $y$ are integers the sum of which is sufficiently high to afford normally solid polymers.

The polycarbonates of this invention can be used for the fabrication of electrical switch components and connectors, instrument cases, lenses, water pump impellers and the like. Extruded film of these polycarbonates can be employed for capacitors and packaging.

EXAMPLE 9.—Polyurethane of 1,4-bis(p-hydroxyphenyl)cyclohexane and piperazine

A solution of 0.86 g. (0.01 mole) of piperazine, 1.0 g. (0.025 mole) of sodium hydroxide, 0.1 ml. of triethylamine in 50 ml. of water was charged to the reaction vessel described in Example 7. A solution of 3.93 g. (0.01 mole) of the dichloroformate of 1,4-bis(p-hydroxyphenyl)cyclohexane in 50 ml. of methylene chloride was added with stirring. After 5 minutes 0.15 ml. of triethylamine was added and stirring continued for one hour. The reaction mixture was then poured into a Waring Blendor containing 300 ml. of isopropanol to precipitate the polyurethane of 1,4-bis(p-hydroxyphenyl)cyclohexane and piperazine which had formed. This polymer was washed three times in the Waring Blendor with 250 ml. water portions. After drying in vacuo, a yield of 3.80 g. (94% of theory) of this polyurethane was obtained, having a reduced viscosity of 1.67 in chloroform at 25° C. (0.2 g. sample in 100 ml. of chloroform). Films of this polymer cast from chloroform had a tensile strength of 9,500 p.s.i., a tensile modulus of 250,000 p.s.i., an elongation of 20–30% and a Tg of about 210–220° C.

The structure of this polyurethane may be represented as shown below.

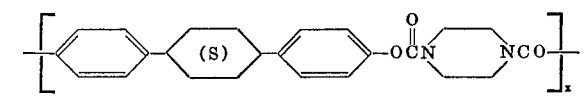

wherein $x$ is an integer having values sufficiently high to afford normally solid polymers.

The polyurethanes of this invention can be used to provide tough, abrasion resistant finishes on floors, wire, leather and rubber goods and the like.

EXAMPLE 10.—Polyurethane of the bis(o-cresol) of cyclohexadiene

This procedure and apparatus of Example 9 are used with 4.73 g. (0.01 mole) of the bis(o-cresol) of cyclohexadiene. The polyurethane of the bis(o-cresol) of cyclohexadiene which forms is similar in physical properties to that derived from 1,4-bis(p-hydroxyphenyl)cyclohexane.

EXAMPLE 11.—Polymerization of the dichloroformate of the bis(o-chlorophenol) of cyclohexadiene The procedure and apparatus of Example 8 are used with 5.14 g. (0.01 mole) of the bis(o-chlorophenol) of cyclohexadiene dichloroformate substituted for the bisphenol cyclohexadiene dichloroformate. The polymer which forms is the polycarbonate of the bis(o-chlorophenol) of cyclohexadiene.

Glass transition temperatures (Tg), also referred to as second order phase transition temperatures, refer to the inflection temperatures found by plotting the resilience (recovery from 1 percent elongation) of a film, ranging in thickness from 3–15 mils, against the temperature. A detailed explanation for determining resilience and inflection point is to be found in an article by A. Brown in "Textile Research Journal," volume 25, 1955, at page 891.

The following ASTM procedures were used:

Pendulum impact—ASTM D–256–56
Tensile strength—ASTM D–882–56T
Tensile modulus—ASTM D–882–56T
Elongation to break—ASTM D–882–56T.

Reduced viscosity values were obtained from the equation:

$$\text{Reduced viscosity} = \frac{t_s - t_0}{c \cdot t_0}$$

wherein:

$t_0$ is the efflux time of the pure solvent.
$t_s$ is the efflux time of the polymer solution.
$c$ is the concentration of the polymer solution expressed in terms of grams of polymer per 100 ml. of solution.

Although the invention has been described in its preferred forms, it is understood that the present disclosure has been made only by way of example, and that numerous changes in the details may be resorted to without departing from the spirit and the scope of the invention.

What is claimed is:

1. Crystalline 1,4 - bis(p-hydroxyphenyl)cyclohexane having a melting point of about 230–232° C.

References Cited

UNITED STATES PATENTS 2,864,868  12/1968  Bader _____ 206—619 X
3,232,994  2/1966   Apel et al. _____ 260—619

BERNARD HELFIN, *Primary Examiner.*

H. ROBERTS, *Assistant Examiner.*